(12) United States Patent
Maier

(10) Patent No.: US 10,173,597 B2
(45) Date of Patent: Jan. 8, 2019

(54) PROTECTION DEVICE FOR A LUGGAGE COMPARTMENT OF AN AUTOMOTIVE VEHICLE

(71) Applicant: Matthias Maier, Esslingen (DE)

(72) Inventor: Matthias Maier, Esslingen (DE)

(73) Assignee: BOS GMBH & CO. KG, Ostfildern (DE)

( * ) Notice: Subject to any disclaimer, the term of this patent is extended or adjusted under 35 U.S.C. 154(b) by 79 days.

(21) Appl. No.: 15/284,597

(22) Filed: Oct. 4, 2016

(65) Prior Publication Data
US 2017/0106802 A1  Apr. 20, 2017

(30) Foreign Application Priority Data
Oct. 16, 2015  (DE) .................. 10 2015 220 192

(51) Int. Cl.
*B60R 5/04*   (2006.01)

(52) U.S. Cl.
CPC .................. *B60R 5/047* (2013.01)

(58) Field of Classification Search
CPC ........... B60R 5/044; B60R 5/047; B60R 5/04; B60R 7/02
USPC ......... 160/271, 272, 267.1, 268.1, 274, 277, 160/266, 370.22, 26, 27, 28, 29, 30, 242; 296/136.04
See application file for complete search history.

(56) References Cited

U.S. PATENT DOCUMENTS

| | | | | |
|---|---|---|---|---|
| 1,950,927 A | * | 3/1934 | McMillan | B60N 2/6009 108/68 |
| 4,277,097 A | * | 7/1981 | Lalanne | B60R 5/045 224/542 |

(Continued)

FOREIGN PATENT DOCUMENTS

| | | | |
|---|---|---|---|
| CA | 2748696 A1 | * 7/2010 | ............... B60R 5/04 |
| DE | 102 18 839 A1 | 11/2003 | |

(Continued)

OTHER PUBLICATIONS

Devergez, English Translation of "FR 2992599" (Year: 2004).*

(Continued)

*Primary Examiner* — Katherine W Mitchell
*Assistant Examiner* — Johnnie A. Shablack
(74) *Attorney, Agent, or Firm* — Flynn Thiel, P.C.

(57) ABSTRACT

Protection device for a vehicle luggage compartment including an accommodation structure, and a winding shaft on which a flexible planar structure is held. The planar structure has a pull-out profile on an end region, and on each of its opposite face sides is connected to a respective entrainer guided for linear movement in a guiding section extending in the longitudinal direction of the luggage compartment of a guiding track fixed to the luggage compartment. The accommodation structure is displaceable in the vertical direction of the luggage compartment, and each guiding track includes a deflection portion and a displacement section extending in the vertical direction of the luggage compartment, along which the entrainer is deflectable and movable in the vertical direction. The accommodation structure includes a coupling device, by which the accommodation structure is displaceable in height together with the entrainer in response to a position of the entrainer.

20 Claims, 4 Drawing Sheets

(56) References Cited

U.S. PATENT DOCUMENTS

| | | | |
|---|---|---|---|
| 5,011,208 A * | 4/1991 | Lewallen | B60R 5/047 296/37.16 |
| 5,083,831 A * | 1/1992 | Foyen | B60N 3/044 296/39.1 |
| 6,416,103 B1 | 7/2002 | Laudenbach et al. | |
| 6,843,518 B2 * | 1/2005 | Schlecht | B60N 2/3011 280/749 |
| 7,028,872 B2 * | 4/2006 | Lobanoff | B60R 5/047 211/123 |
| 7,537,265 B2 * | 5/2009 | Hori | B60R 5/047 296/100.15 |
| 7,673,921 B2 * | 3/2010 | Hirayama | B60R 5/047 296/100.15 |
| 7,891,729 B2 * | 2/2011 | Fujishima | B60J 7/061 296/218 |
| 7,900,987 B2 * | 3/2011 | Seeg | B60R 5/047 296/24.4 |
| 7,934,761 B2 * | 5/2011 | Buehl | B60R 7/02 296/37.1 |
| 8,727,414 B2 * | 5/2014 | Staib | B60R 5/047 296/24.43 |
| 8,919,851 B2 * | 12/2014 | Maier | B60R 21/06 296/24.43 |
| 9,090,210 B2 * | 7/2015 | Demma | B60R 5/04 |
| 9,409,521 B2 | 8/2016 | Maier et al. | |
| 9,573,527 B2 * | 2/2017 | Murray | B60R 5/047 |
| 9,725,044 B2 * | 8/2017 | Walter | B60R 5/047 |
| 9,738,226 B2 * | 8/2017 | Kamada | B60R 5/048 |
| 2005/0073167 A1 | 4/2005 | De Gaillard | B60J 5/106 296/76 |
| 2014/0015271 A1 * | 1/2014 | Demma | B60R 5/045 296/24.44 |
| 2015/0001874 A1 | 1/2015 | Maier et al. | |
| 2017/0066381 A1 * | 3/2017 | Disley | B60R 5/047 |
| 2017/0113621 A1 * | 4/2017 | Barnes | B60R 5/047 |
| 2017/0129408 A1 * | 5/2017 | Murray | B60R 5/047 |

FOREIGN PATENT DOCUMENTS

| | | | | |
|---|---|---|---|---|
| DE | 10218839 A1 * | 11/2003 | | B60R 5/047 |
| DE | 103 57 153 A1 | 7/2005 | | |
| DE | 102004060747 A1 * | 7/2006 | | B60R 5/047 |
| DE | 10 2009 010 967 A1 | 9/2010 | | |
| DE | 102009010967 A1 * | 9/2010 | | B60R 5/047 |
| DE | 102010015182 B4 * | 8/2013 | | B60R 5/047 |
| DE | 19906648 B4 * | 4/2014 | | B60R 5/045 |
| DE | 102013009943 A1 * | 6/2014 | | B60R 5/047 |
| DE | 10 2014 211 163 A1 | 12/2014 | | |
| DE | 102015110891 A1 * | 1/2017 | | B60R 5/047 |
| EP | 1 084 907 A2 | 3/2001 | | |
| EP | 3138737 A1 * | 3/2017 | | B60R 5/045 |
| EP | 3150439 A1 * | 4/2017 | | B60R 5/047 |
| EP | 3156284 A1 * | 4/2017 | | B60R 5/047 |
| FR | 2844485 A1 * | 3/2004 | | B60J 5/101 |
| FR | 2992599 A1 * | 1/2014 | | B60R 5/047 |
| FR | 2995571 A3 * | 3/2014 | | B60R 5/047 |
| FR | 3046970 A3 * | 7/2017 | | B60R 5/047 |
| JP | 11245731 A * | 9/1999 | | |
| WO | WO-2009150370 A1 * | 12/2009 | | B60R 5/04 |
| WO | WO-2015067301 A1 * | 5/2015 | | B60R 5/047 |
| WO | WO-2017145310 A1 * | 8/2017 | | B60R 5/04 |

OTHER PUBLICATIONS

Aoshima, English Translation of "JPH11245731" (Year: 1999).*
Zunzer, English Translation of "DE102004060747" (Year: 2006).*
Gray, English Translation of "DE10357153" (Year: 2005).*
Couturier, English Translation of "WO2015067301." (Year: 2015).*
European Search Report issued in Application No. 16 18 9775 with English language translation of category of cited documents dated Feb. 13, 2017 (6 pages).
Office Action of German Patent Office issued in Application No. 10 2015 220 192.9 dated Jul. 14, 2016 (4 pages).

* cited by examiner

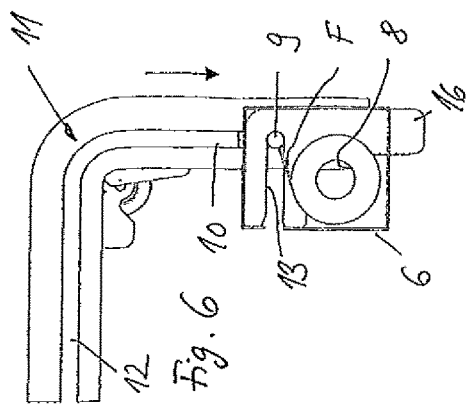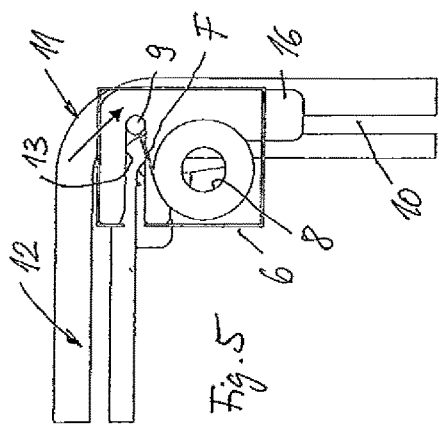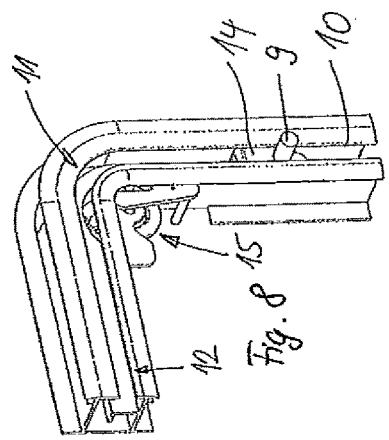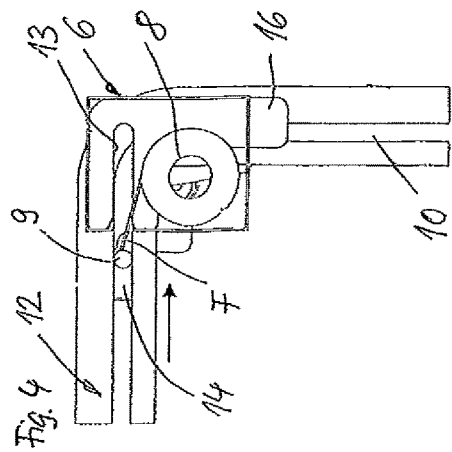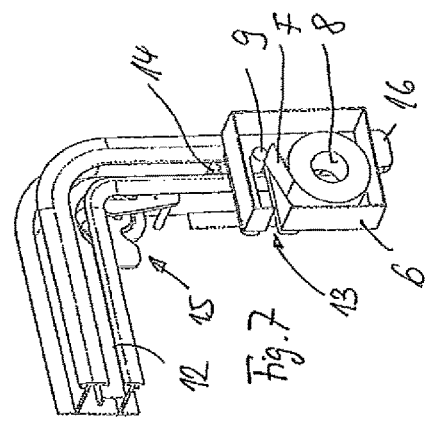

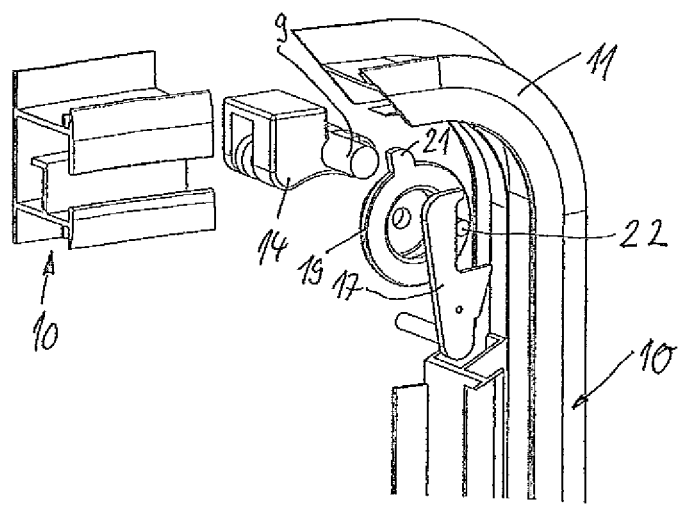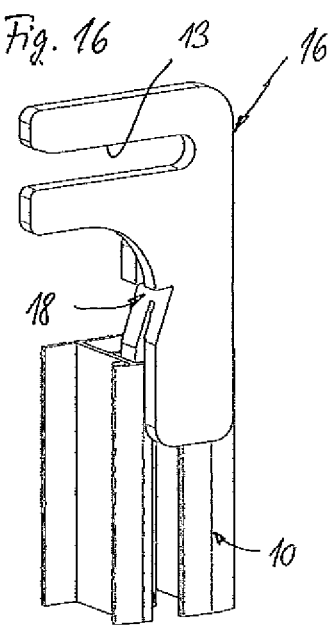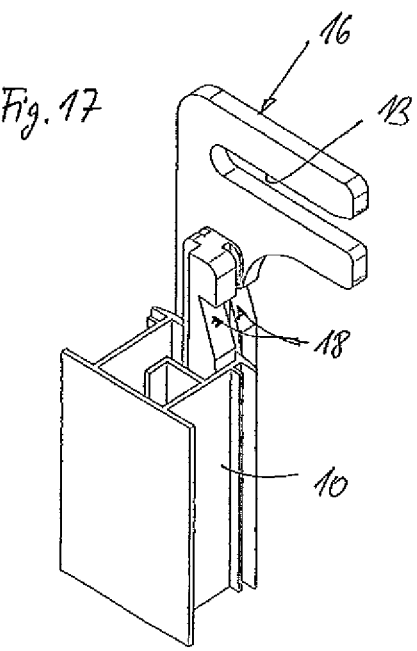

PROTECTION DEVICE FOR A LUGGAGE COMPARTMENT OF AN AUTOMOTIVE VEHICLE

CROSS-REFERENCE TO RELATED APPLICATIONS

This claims priority from German Patent Application No. 10 2015 220 192.9, filed on Oct. 16, 2015, the disclosure of which is hereby incorporated by reference in its entirety into this application.

FIELD OF THE INVENTION

The invention relates to a protection device for a luggage compartment of an automotive vehicle, comprising a dimensionally stable accommodation structure, wherein a winding shaft is rotatably mounted, on which a flexible planar structure is held to be windable and unwindable, which planar structure is provided with a dimensionally stable pull-out profile on a face end region that is in front in the unwinding direction, which profile is connected to a respective entrainer on each of its opposite face sides, which entrainer is guided for linear movement in a guiding section extending in the longitudinal direction of the luggage compartment of a guiding track fixed to the luggage compartment.

BACKGROUND OF THE INVENTION

A protection device in the form of a luggage compartment cover for a luggage compartment of a passenger vehicle is disclosed in DE 10 2014 211 163 A1. The luggage compartment cover has a cartridge housing, wherein a winding shaft is rotatably mounted. On the winding shaft a flexible cover fabric is held to be windable and unwindable, and is stowed within the cartridge housing in a wound-up rest position. In a pulled-out protective position, the cover fabric is pulled out approximately horizontally towards a rear portion of the passenger vehicle. The cover fabric has, on its face end region that is in front in the pull-out direction, a dimensionally stable pull-out profile which in a pulled-out functional position can be hooked in holders fixed to the luggage compartment. The cartridge housing is displaceable in the vertical direction of the luggage compartment between its functional condition, wherein the cover fabric can be pulled out approximately horizontally towards the rear, and a rest position, wherein the cartridge housing is lowered into a luggage compartment bottom. In the functional condition of the cartridge housing, the cover fabric is pulled out manually, hooked in the holders fixed to the luggage compartment, and returned manually in a correspondingly reversed manner back to the wound-up rest position within the cartridge housing. For that purpose, the winding shaft is associated with a mechanical return spring.

EP 1 084 907 B1 discloses a luggage compartment cover for a passenger vehicle, wherein a dimensionally stable pull-out profile of a cover fabric is guided in lateral guide rails on opposite face sides of the fabric. Each face side of the pull-out profile is retained in a respective entrainer which is guided in the guide rail for longitudinal shifting. For displacing the entrainer, drive cables are provided and displaced within the guide rails in a synchronized manner using a drive motor.

SUMMARY OF THE INVENTION

An object of the invention is to provide a protection device of the type mentioned in the introduction which has improved functionality and superior convenience for operators or vehicle passengers. This object is achieved in that the accommodation structure is displaceable in the vertical direction of the luggage compartment, and in that each guiding track includes a deflection portion and a displacement section extending in the vertical direction of the luggage compartment, along which the entrainer is deflectable and movable in the vertical direction, and in that the accommodation structure includes a coupling device, by means of which the accommodation structure is displaceable in height together with the entrainer in response to a position of the entrainer. What is meant by the "accommodation structure" for the winding shaft and the flexible planar structure in the wound-up condition is an at least largely closed housing, or even an open box-type frame, or a dimensionally stable profile structure of similar design.

By means of the solution according to the invention, the accommodation structure, preferably a cartridge housing, can be lowered into a luggage compartment bottom, when not used, so that the spatial conditions of the luggage compartment are not impaired by the accommodation structure in the immerged rest position of the accommodation structure. According to the invention, fully automatic operation of the various functions of the protection device can be provided, in that both the displacement of the entrainers on opposite sides of the pull-out profile and the vertical displacement of the accommodation structure are done by using a drive. According to the invention, the movement of the entrainers automatically also causes a corresponding vertical displacement of the accommodation structure, once the entrainers move past the region of opposite face sides of the accommodation structure. The solution according to the invention is with particular advantage appropriate for a configuration of the protection device as a luggage compartment cover for a passenger vehicle. The solution according to the invention can in a similar manner be employed for covering a loading platform of a truck or a pick-up vehicle. As an alternative, the protection device according to the invention can be provided in the vicinity of an open or closed luggage compartment of a railway vehicle.

In an embodiment of the invention, the coupling device includes a catch link for the pull-out profile, where the pull-out profile plunges in, in response to the position of the entrainer. The catch link is preferably fixedly disposed on the accommodation structure. Advantageously, a respective catch link is provided on each face side in the vicinity of the opposite face sides of the pull-out profile, wherein the opposite catch links have an identical design. Particularly preferred is that the two catch links are integrated in lateral parts of the accommodation structure, which parts are preferably guide carriages for vertical displacement of the accommodation structure.

In a further embodiment of the invention, the coupling device includes a locking device to secure the accommodation structure in a functional condition. The locking device preferably has a mechanical design. What is meant thereby is that locking is by mechanically interengaging members, parts or sections. As an alternative, locking by magnetic or electromagnetic means is provided.

In a further embodiment of the invention, the locking device is associated with a control device which is coupled to a trajectory of the entrainer such that the locking device is releasable in response to a move of the entrainer in a region where the planar structure is at least largely completely wound onto the winding shaft. The control device preferably has a mechanical design. However, it can also interact with the locking device by electric, hydraulic or pneumatic action. The entrainers, entraining the opposite face sides of the pull-out profile, are necessarily located in the vicinity of the accommodation structure when the planar structure is at least largely completely wound onto the winding shaft. Namely, then the pull-out profile is likewise retracted in the direction towards the accommodation structure far enough that it is positioned in the immediate vicinity of the accommodation structure. The corresponding face sides of the pull-out profile then plunge into the catch link, and simultaneously the entrainers necessarily move into the deflection portion of the respective guiding track.

In a further embodiment of the invention, the catch link is open in the longitudinal direction of the luggage compartment away from the winding shaft, and is oriented at least largely in parallel to the guiding section for the entrainer. The respective guiding section for the respective entrainer corresponds to the region of the respective guiding track, with the embodiment of the protection device as a luggage compartment cover, which region extends in the longitudinal direction of the luggage compartment approximately horizontally in the vicinity of a respective lateral wall of the luggage compartment.

In a further embodiment of the invention, the catch link is integrated in the accommodation structure. Preferably, two identical catch links are provided on opposite face sides of the accommodation structure, and are designed as sections of lateral parts of the accommodation structure.

In a further embodiment of the invention, the control device includes a crank mechanism cooperating with a ratchet of the locking device, wherein the ratchet secures the accommodation structure in the functional condition in a form-fitting manner. The crank mechanism is preferably positioned adjacent to the respective deflection portion of the guiding track for the respective entrainer. The crank mechanism includes at least one control member projecting into a trajectory of the respective entrainer in the deflection portion, in order to achieve forced actuation of the crank mechanism, once the entrainer enters the deflection portion. By releasing the ratchet, the accommodation structure is released so that it can be displaced from its upper functional condition in the vertical direction of the luggage compartment downwards.

In a further embodiment of the invention, the accommodation structure is guided, on each face side, in a vertically displaceable manner in a guiding path fixed to the luggage compartment, which path extends in parallel to the displacement section for the respective entrainer. As a result, the accommodation structure can be entrained downwards or upwards in the vertical direction of the luggage compartment, together with lowering of the opposed entrainers in the respective displacement section of the guiding track.

In a further embodiment of the invention, each entrainer is configured for releasable entrainment of the face side of the pull-out profile. Said embodiment is advantageous to prevent damages in case of an accidental impact of the pull-out profile on an obstacle within the luggage compartment.

In a further embodiment of the invention, a drive system is provided which includes a flexible drive cable for each entrainer, in order to displace the entrainers in a synchronized manner in the longitudinal direction and in the vertical direction of the respective guiding track. The drive system comprises, preferably, at least one electric drive motor which drives the two flexible drive cables via appropriate transmissions.

In a further embodiment of the invention, there is an intersection of the catch link and the displacement section of the guiding track extended in the vertical direction. Thereby, the pull-out profile with its opposite face sides is forcedly secured in the catch links of the accommodation structure in a form-fitting manner, as soon as the entrainers and, consequently, the face sides of the pull-out profiles are deflected in the deflection portions of the guiding tracks downwards in the direction of the displacement sections and are displaced in said displacement sections.

In a further embodiment of the invention, the guiding path for the face side of the accommodation structure and the displacement section for the respective entrainer are integrated in a common profile rail arrangement. Preferably, the guiding path and the displacement section are disposed successively, as seen in the transverse direction of the luggage compartment, in case that the accommodation structure is likewise extended in the transverse direction of the luggage compartment and the planar structure is extractable in the longitudinal direction of the luggage compartment.

Further advantages and features of the invention will become apparent from the claims and from the description below of a preferred exemplary embodiment of the invention which is illustrated with reference to the drawings.

BRIEF DESCRIPTION OF THE DRAWINGS

FIGS. 4 to 6 show a schematic view of a section of a portion of the protection device according to FIGS. 1 to 3 in different functional positions;

FIG. 7 shows a perspective view of the protection device according to FIG. 6;

FIG. 8 shows the functional position according to FIG. 7 with parts of the protection device omitted;

FIG. 15 shows an enlarged, perspective exploded view of a portion of the protection device according to FIGS. 1 to 14;

FIG. 16 shows a perspective view of a face end portion of a cartridge housing of the protection device according to FIGS. 1 to 15; and FIG. 17 shows the portion according to FIG. 16 in another perspective view.

DETAILED DESCRIPTION

Figure 1:
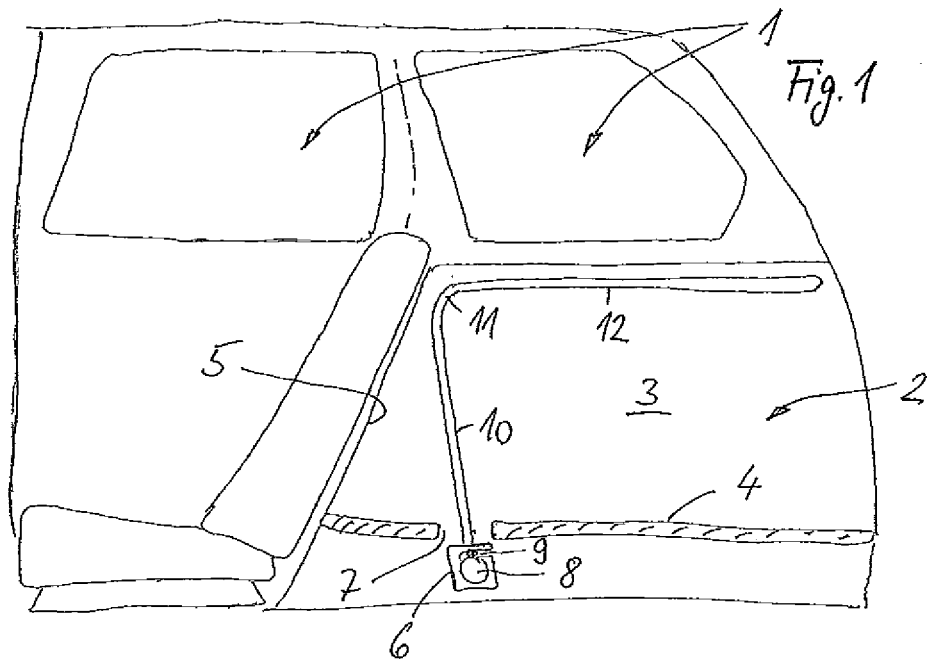
FIGS. 1 to 3 show a schematic view of a vehicle interior of a passenger vehicle including an embodiment of a protection device according to the invention for a luggage compartment of the passenger vehicle in different functional positions.
Figure 2:
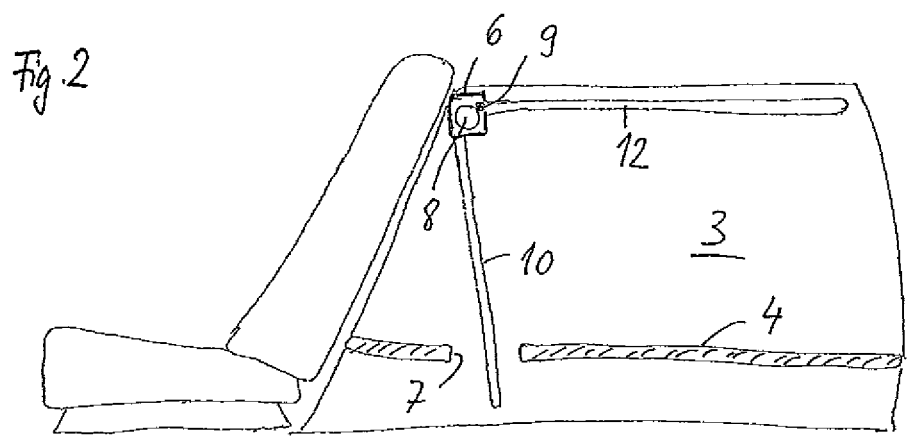
Figure 3:
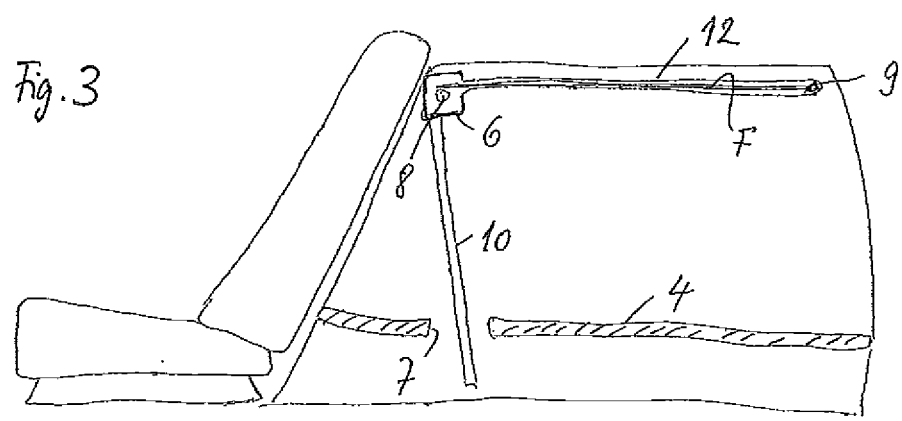

According to FIGS. 1 to 3, a passenger vehicle has a vehicle interior 1 comprising a luggage compartment 2 in a rear section. The luggage compartment 2 is delimited on each of the opposite longitudinal sides thereof by a respective lateral wall 3 of the vehicle interior. Towards the rear, said luggage compartment 2 is delimited by a rear lid or a rear door, not illustrated in more detail. Towards the front, said luggage compartment 2 is delimited by a back rest arrangement 5 of a rear seat bench up to the height of a vehicle beltline. The luggage compartment 2 has a luggage compartment floor 4 which is provided, immediately behind the back rest arrangement 5, with a recess 7 which may be closable by a cover (not illustrated). The recess 7 is designed such that a cartridge housing 6 used as an accommodation structure of a protection device for the luggage compartment 2 can be lowered down into said recess 7. Preferably, in a lowered rest position, a top side of the cartridge housing 6 is flush with a top side of the luggage compartment floor 4, wherein the cartridge housing 6 in said rest position just as well occupies the recess 7 completely at least largely. Due to the schematic illustration according to FIG. 1, this feature is not clearly evident from the drawing.

The cartridge housing 6 extends in the transverse direction of the vehicle and, thus, in the transverse direction of the luggage compartment 2. The cartridge housing 6 is displaceable in the vertical direction of the luggage compartment and, according to FIGS. 1 to 3, with a minor additional component in the longitudinal direction of the luggage compartment between a lower rest position according to FIG. 1 and an upper functional position, as will be described in more detail below. Within the cartridge housing 6 a winding shaft 8 is rotatably mounted. On the winding shaft 8 a flexible planar structure F in the form of a cover fabric is held to be windable and unwindable. In the functional position of the cartridge housing 6, the planar structure F can be pulled out approximately horizontally rearwards to the vehicle rear section in the longitudinal direction of the luggage compartment 2 from a longitudinal slot (not illustrated in more detail) of the cartridge housing 6, in order to cover the luggage compartment 2 and, thereby, to obstruct a view from the outside into the luggage compartment 2. The winding shaft 8 is associated with a volute spring acting as a return spring, said spring exerting a permanent torque on the winding shaft 8 in the winding-up direction. The planar structure F has a dimensionally stable pull-out profile 9 on a face end region that is in front in the pull-out direction, which profile extends over the entire width of the planar structure F and on each of its opposite face sides projects into a respective guiding track 10 to 12 in the vicinity of the respective lateral wall 3 of the luggage compartment 2.

With reference to FIGS. 1 to 14 it is apparent that the guiding track includes, in the vicinity of each of the two opposite lateral walls 3, a displacement section 10 extending essentially in the vertical direction of the luggage compartment 2, a deflection portion 11 adjoining the displacement section 10 at the top, and a guiding section 12 adjoining the deflection portion 11 in the longitudinal direction of the luggage compartment 2 towards the vehicle rear section. The displacement section 10, the deflection section 11 and the guiding section 12 are aligned and pass over into another, wherein the deflection section is designed in the shape of a circular arc or in a type of circular arc. The guiding section 12 of the respective guiding track extends approximately horizontally rearwards in the longitudinal direction of the luggage compartment towards the vehicle rear section. The guiding track provided by said sections is fixed to corresponding sections of the supporting structure of the vehicle body of the passenger vehicle in the vicinity of each lateral wall 3 of the luggage compartment 2 and, thus, is disposed stationary within the luggage compartment 2. The respective guiding track in the vicinity of the opposite lateral walls 3 is respectively provided by a profile rail arrangement made of metal, preferably made of a light metal alloy, and the design thereof is apparent with reference to the FIGS. 7 and 8, and FIGS. 15 to 17. The respective profile rail arrangement is advantageously—not illustrated in more detail—disposed behind a corresponding side lining of the respective lateral wall 3 so that corresponding functional parts of the protection device, as related to guiding of the cartridge housing 6 or guiding of the pull-out profile 9, are essentially concealed by the corresponding side lining.

The pull-out profile 9 projects into the respective guiding tracks 10 to 12 of the opposite lateral walls 3 on its opposite face sides, in order to allow its displacement in parallel within the two guiding tracks along said guiding tracks. For synchronized displacement of the two opposite face sides of the pull-out profile 9, a respective entrainer 14 is disposed in each of the guiding tracks 10 to 12, which entrainer is movable in linear motion within the respective guiding track 10 to 12. The respective entrainer 14 receives the corresponding face end of the pull-out profile 9 in a form-fitting manner. Indeed, each entrainer 14 is configured such that in case of severe strain which may occur during a displacement move of the pull-out profile 9, in particular due to an obstacle located within the luggage compartment, the pull-out profile 9 can be removed from the entrainers 14. This is to prevent that excessive forces, which are likely to act on the pull-out profile 9, may cause damage of the pull-out profile 9 or the guiding tracks 10 to 12.

The two entrainers 14 are lengthwise displaceable within the respective guiding track by means of a respective drive cable A. The respective drive cable A is illustrated schematically with reference to FIGS. 9 and 12, 13. The two drive cables A are implemented as flexible thread shafts, also referred to as flexshafts. The two drive cables A are part of a drive system, comprising an electric drive motor which drives the drive cables A in a synchronized manner via a corresponding worm gear. The drive cables A are configured to be rigid in tension and in compression and have flexibility, so that they can pass through the deflection portion 11 of each guiding track 10 to 12 in a curved shape.

In the vicinity of the opposite face sides of the cartridge housing 6, a respective guide carriage 16 is fixed to the cartridge housing 6, which carriage is guided for sliding movement within a corresponding rail section of the profile rail arrangement (FIGS. 16 and 17) in parallel to the displacement section 10 of the guiding track 10, 11, 12 in the vertical direction of the luggage compartment 2. The respective guide carriage 16 provides a respective lateral part of the cartridge housing 6, and is fixedly connected to the cartridge housing 6. The guide carriage 16 includes a catch link 13 on the level of the longitudinal slot of the cartridge housing 6, which link is configured to accommodate the associated face end of the pull-out profile 9. In the functional position of the cartridge housing 6, in which the planar structure F is extractable rearwards approximately horizontally in the longitudinal direction of the luggage compartment, the slot-type catch link 13 of each guide carriage 16 of the cartridge housing 6 is aligned with the guiding section 12 of the guiding track 10 to 12 of each lateral wall 3.

Thereby, during winding of the planar structure F onto the winding shaft 8 within the cartridge housing 6, the pull-out profile 9 can plunge into the longitudinal slot of the cartridge housing 6 and, thus, also into the two catch links 13, which are open to the rear towards the vehicle rear section, of the guide carriages 16 serving as lateral parts for the cartridge housing 6.

The cartridge housing 6 is secured in its functional position according to FIGS. 2 and 3 by two locking devices which are part of two coupling devices 15. Each coupling device 15 is positioned on the level of the deflection section 11 of the respective guiding track 10 to 12. Among the respective coupling devices 15 are also the respective catch links 13 of the cartridge housing 6. The two opposite coupling devices as well as the two opposite locking devices have an identical design. The two locking devices are transferred synchronously from a locking condition to a release condition using corresponding mechanical control devices 19, 21, 22 of the respective coupling devices 15. The two locking devices are used to secure the cartridge housing 6 in the functional position according to FIGS. 2 and 3. In the vicinity of the guide carriages 16 forming the lateral parts of the cartridge housing 6, a respective wedge-type locking seat 18 is provided, and a respective ratchet 17 of the locking device engages therein. The ratchet 17 is mounted, as is apparent with reference to FIGS. 9 to 15, to be pivotable between a locking position engaging in the locking seat 18 and a release position releasing the locking seat 18 (cf. FIGS. 11 and 12). The corresponding ratchet 17 is spring-loaded towards its locking position by a return spring, not illustrated in more detail.

Once the ratchets are transferred to their release positions, the cartridge housing 6 with its two lateral parts in the form of the guide carriages 16 can be shifted in parallel to the displacement section 10 for the respective entrainer 14 to a corresponding rail section of the profile rail arrangement in the vertical direction of the luggage compartment. The opposite guide carriages 16 ensure that the cartridge housing 6 is displaced in parallel in the vertical direction.

Figure 9:
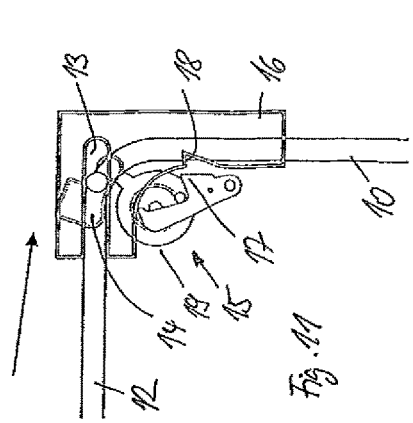
FIGS. 9 to 14 show the protection device according to FIGS. 1 to 8 in different functional positions within the luggage compartment.
Figure 12:
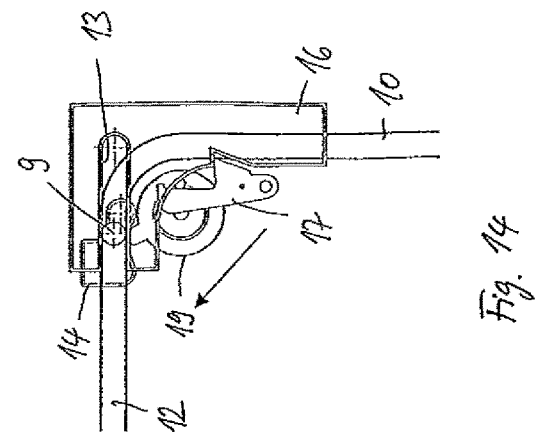
Figure 10:
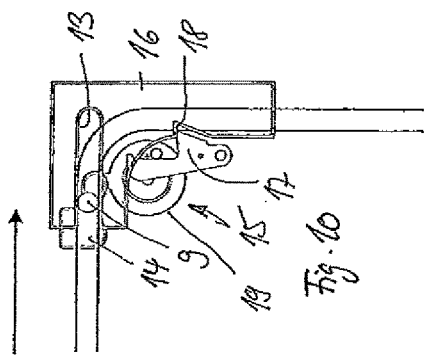
Figure 13:
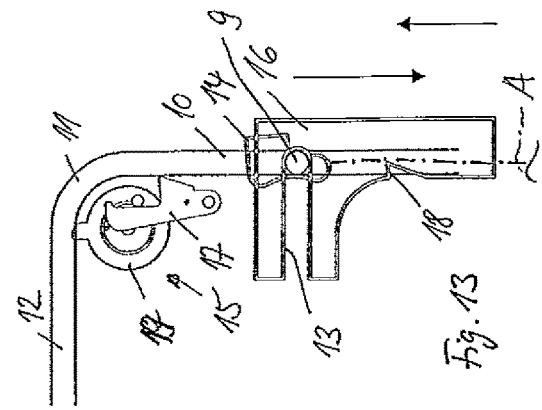
Figure 11:
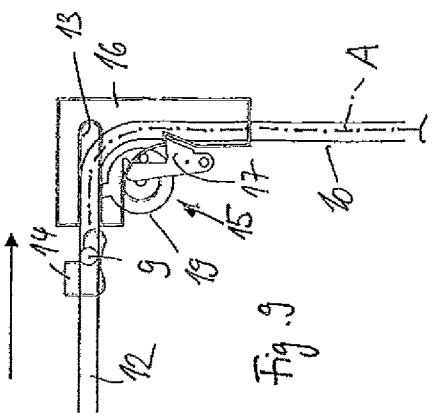
Figure 14:
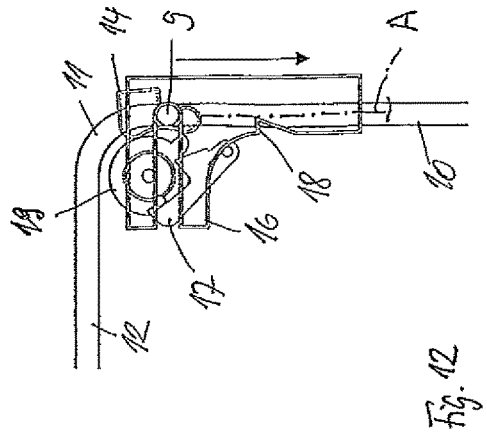

Using forced control, as will be described in more detail below, the cartridge housing 6 is displaced in the vertical direction of the luggage compartment exclusively in response to corresponding moves of the opposite entrainers 14 in the vicinity of the deflection sections 11 and the displacement sections 10. For that purpose, the coupling device 15 includes the mechanical control device in the vicinity of each of the deflection sections 11, to coordinate a movement of the respective entrainer 14 forcedly to a corresponding opening movement of the respective ratchet 17. For that purpose, the control device includes a crank disk 19 including a control cam 21 which projects radially from the crank disk and projects into the trajectory of the entrainer 14 or the pull-out profile 9. Additionally, the crank disk 19 is associated with an axially projecting crank pin 22—in relation to a rotational axis of the crank disk 19—contacting a lever section of the ratchet 17. Upon displacing the entrainer 14 with the pull-out profile 9 in the guiding section 12 in the longitudinal direction of the luggage compartment towards the front (cf. FIGS. 9 and 10), the pull-out profile 9 with its opposite face ends necessarily plunges in the catch links 13 of the guide carriage 16, shortly before the wound-up rest position of the planar structure F is reached. During further displacing of the pull-out profile 9 into the catch links 13—with corresponding further continued movement of the entrainers 14 into the deflection sections 11—the control cam is turned clockwise according to the illustrations of FIGS. 9 to 15, whereby the crank pin 22 necessarily transfers the ratchet 17 to the open position. As a result, the cartridge housing 6 is released from the locking position and can be lowered in the corresponding guiding path, which extends in parallel to the displacement section 10 of each guiding track downwards. As a consequence of the fact that the pull-out profile 9 with its opposite face ends is kept trapped in the respective entrainer 14 and in the guiding track, and furthermore the catch links 13 of the guide carriages 16 intersect with the guiding track in the vicinity of the deflection section 11 and the displacement section 10, the pull-out profile 9 is trapped in the cartridge housing 6, specifically, in the end region of the respective catch link 13. As a result, the pull-out profile 9 necessarily supports the cartridge housing 6 in the vicinity of the entrainers 14 so that the cartridge housing 6 is lowered together with the entrainers 14 in forced guidance, or also is raised again in the reverse direction (cf. FIGS. 13 and 14). Since during displacing the pull-out profile 9 again from the displacement section 10 upwards into the deflection section 11 and in the direction towards the guiding section 12, the crank disk 19 is necessarily returned to the initial condition via the control cam 21, the corresponding return spring can likewise return the respective ratchet 17 to the locking position, whereby the guide carriages 16 are again secured in a form-fitting manner in the functional position of the cartridge housing 6. Now, the pull-out profile 9 can again be moved via the entrainers 14 out of the cartridge housing 6 and out of the catch links 13 rearwards in the direction towards the vehicle rear section in a simple manner. Thus, the initial condition according to FIGS. 4 and 9 is reestablished.

The invention claimed is:

1. A protection device for a luggage compartment of an automotive vehicle, the protection device comprising:
    a dimensionally stable accommodation structure;
    a winding shaft rotatably mounted to the dimensionally stable accommodation structure;
    a flexible planar structure being held on the winding shaft to be windable and unwindable;
    a dimensionally stable pull-out profile on a face end region of the flexible planar structure that is in front in an unwinding direction;
    a plurality of entrainers, each of the entrainers being connected to opposite sides of the pull-out profile, each of the entrainers being guided for linear movement in a guiding section of one of a plurality of guiding tracks fixed to the luggage compartment, each guiding section extending in a longitudinal direction of the luggage compartment;
    the accommodation structure being displaceable in a vertical direction of the luggage compartment;
    each of the guiding tracks further including a deflection portion and a displacement section, the displacement section extending in the vertical direction of the luggage compartment;
    each of the entrainers being deflectable along the deflection portion and movable in the vertical direction along the displacement section;
    the accommodation structure including a coupler by which the accommodation structure is displaceable in the vertical direction together with the entrainers in response to vertical movement of the entrainers.

2. The protection device according to claim 1, wherein the coupler includes a catch link for the pull-out profile, and the pull-out profile is configured to enter into the catch link.

3. The protection device according to claim 2, wherein the catch link is open in the longitudinal direction of the luggage compartment away from the winding shaft, and is oriented at least largely parallel to the guiding section for the entrainers.

4. The protection device according to claim 2, wherein the catch link is integrated in the accommodation structure.

5. The protection device according to claim 2, wherein an intersection of the catch link and the displacement section of each of the guiding tracks extends in the vertical direction.

6. The protection device according to claim 1, wherein the coupler includes a locking device which secures the accommodation structure in a functional position.

7. The protection device according to claim 6, wherein the locking device is associated with a mechanical control device which is linked to a trajectory of the entrainers such that the locking device is releasable in response to movement of the entrainers in a region where the planar structure is at least largely wound onto the winding shaft.

8. The protection device according to claim 7, wherein the control device includes a crank mechanism cooperating with a ratchet of the locking device, wherein the ratchet secures the accommodation structure in the functional position in a form-fitting manner.

9. The protection device according to claim 1, wherein the accommodation structure is guided, on each face side, in a vertically displaceable manner in a guiding path fixed to the luggage compartment, the guiding path extending parallel to the displacement section for the entrainers.

10. The protection device according to claim 9, wherein the guiding path for each face side of the accommodation structure and the displacement section for the entrainers are integrated in a common profile rail arrangement.

11. The protection device according to claim 1, wherein each of the entrainers is configured for releasable entrainment of the sides of the pull-out profile.

12. The protection device according to claim 1, further including a drive system, the drive system including a flexible drive cable for each of the entrainers to displace the entrainers in a synchronized manner in the longitudinal direction and in the vertical direction of each guiding track.

13. A protection device for a luggage compartment of an automotive vehicle, the protection device comprising:
a dimensionally stable accommodation structure;
a winding shaft rotatably mounted to the dimensionally stable accommodation structure;
a flexible planar structure being held on the winding shaft to be windable and unwindable;
a dimensionally stable pull-out profile on a face end region of the flexible planar structure that is in front in an unwinding direction;
a plurality of entrainers, each of the entrainers being connected to opposite sides of the pull-out profile, each of the entrainers being guided for linear movement in a guiding section of one of a plurality of guiding tracks fixed to the luggage compartment, each guiding section extending in a longitudinal direction of the luggage compartment;
the accommodation structure being displaceable in a vertical direction of the luggage compartment;
each of the guiding tracks further including a deflection portion and a displacement section, the displacement section extending in the vertical direction of the luggage compartment;
each of the entrainers being deflectable along the deflection portion and movable in the vertical direction along the displacement section;
wherein the entrainers move horizontally without movement of the accommodation structure and the entrainers move vertically simultaneously with the accommodation structure to allow for simultaneous vertical displaceable in the vertical direction of the entrainers and the accommodation structure.

14. The protection device according to claim 13, wherein the accommodation structure includes a catch link for the pull-out profile, and the pull-out profile is configured to slide into the catch link as the entrainers move in the longitudinal direction.

15. The protection device according to claim 14, wherein the catch link is open in the longitudinal direction of the luggage compartment away from the winding shaft, and is oriented at least largely parallel to the guiding section for the entrainers.

16. The protection device according to claim 14, wherein an intersection of the catch link and the displacement section of each of the guiding tracks extends in the vertical direction.

17. The protection device according to claim 13, further including a locking device which secures the accommodation structure in a vertically raised position.

18. The protection device according to claim 17, wherein the locking device is releasable in response to movement of the entrainers in a region where the planar structure is at least largely wound onto the winding shaft.

19. The protection device according to claim 18, wherein the locking device includes a crank mechanism cooperating with a ratchet of the locking device, wherein the ratchet secures the accommodation structure in the vertically raised position.

20. The protection device according to claim 13, wherein the accommodation structure is guided, on each face side, in a vertically displaceable manner in a guiding path fixed to the luggage compartment, the guiding path extending parallel to the displacement section for the entrainers.

* * * * *